United States Patent Office 3,775,400
Patented Nov. 27, 1973

3,775,400
STARCHES MODIFIED WITH N-VINYL COMPOUNDS
Otto B. Wurzburg, Whitehouse Station, and Wadym Jarowenko, Plainfield, N.J., assignors to National Starch and Chemical Corporation, New York, N.Y.
No Drawing. Filed Oct. 3, 1972, Ser. No. 294,551
Int. Cl. C08b *19/04*
U.S. Cl. 260—233.3 R          11 Claims

ABSTRACT OF THE DISCLOSURE

Modified starch products possessing labile substituent groups are produced by reacting a starch base with N-vinyl amido or N-vinyl imido compounds wherein the nitrogen to which the vinyl group is attached is adjacent to at least one carbonyl group. The reaction is carried out under controlled conditions and, optionally, in the presence of a neutral salt. The resulting inhibited and stabilized starch products are useful as thickeners, binders, and dusting powders.

BACKGROUND OF INVENTION

This invention relates to a novel method for the preparations of inhibited and stabilized starch products and to the products produced thereby.

The term "stabilized starch" refers to a starch in which the tendency to congeal is reduced. Such stabilized starches exhibit an enhanced tendency to swell when cooked in aqueous suspension to form stable colloids with reduced tendencies to thicken, to form gels, or to separate by syneresis.

The term "inhibited starch" refers to a starch in which the granules have been toughened so they are more resistant to rupturing during cooking than ordinary starch granules. Inhibited starches may exhibit a reduced tendency to swell or gelatinize and generally display a comparatively short, non-cohesive consistency after cooking. The degree of inhibition can be controlled and varied over a wide range so as to produce starches in which the tendency of the swollen granules to rupture is decreased through successive stages to starch products in which the swelling of the granules is so highly restrained that the granules will not swell noticeably when cooked in boiling water.

It is well known that starch may be inhibited, while in granular form, by reaction with polyfunctional reagents such as epichlorohydrin, phosphorus oxychloride, divinyl sulfone, etc., which crosslink the starch molecules within the granule. This reaction results in the formation of covalent chemical linkages which reinforce the normal hydrogen bonds between starch molecules which hold the granule together. As a result, when the treated starch is cooked under conditions which normally weaken or destroy the hydrogen bonds the granule is swollen but remains intact because of these covalent linkages.

Inhibited starches are desired for various industrial uses. They are particularly useful in applications where the cohesiveness and stringiness of certain untreated starches are found to be objectionable, for example, in various industries where starch products yielding short, smooth pastes on cooking are called for as thickening agents or pastes. Highly inhibited types are useful as surgical dusting powers. It is a prime object of this invention to provide a novel method for the preparation of modified starch products. It is another object of this invention to provide a stabilized starch product. It is a further object of this invention to provide an inhibited starch product. It is still a further object of this invention to provide a modified starch product which is stabilized and also inhibited. Various other objects and advantages of this invention will become apparent from the following description.

We have found that stabilized and inhibited starch products and those having the combined types of modifications can be produced by reacting a starch with N-vinyl amido or imido compounds wherein the nitrogen to which the vinyl group is attached is adjacent to at least one carbonyl group, under controlled conditions and, optionally, in the presence of a neutral salt catalyst. More precisely, we have discovered that stabilized or inhibited starch products and stabilized, inhibited starch products may be produced by regulating the pH level within the acidic range and the temperature of the reaction. The stabilized starch products are characterized by the presence of substituent groups which are stable in neutral and alkaline media. The inhibited starch products can be easily and controllably converted into more highly swollen products which are then comparable to untreated starches.

As previously indicated, the essential ingredients necessary for the preparation of the novel starch derivatives of this invention include starch, the N-vinyl compound and, optionally, the neutral salt.

The N-vinyl compounds useful as inhibiting and stabilizing reagents according to this invention are those selected from the group consisting of N-vinylamides, N-vinyllactams, N-vinylimides, N-vinylurethanes and N-vinyloxazolidones.

The N-vinylamides suitable for our process include those compounds having structures represented by the following general formula:

(I) 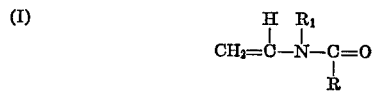

wherein R is an alkyl group having no more than 18 carbon atoms, preferably from 2 to 6, and $R_1$ is also an alkyl group, and the number of carbon atoms in the latter group and that of R may differ, i.e., N-vinyl, N-methyl acetamide; N-vinyl, N-methyl acetamide; N-vinyl, N-methyl butyramide, etc.

The N-vinyllactams are represented by the following general formula:

(II) 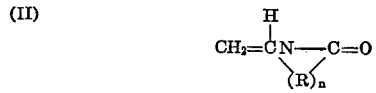

wherein R is a methylene group and *n* is 2 or more, preferably from 2 to 6.

The N-vinylimide are represented by the following general formula:

(III) 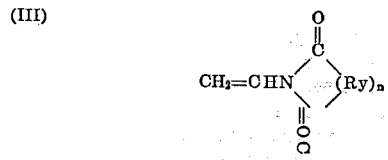

wherein Ry is a phenylene group and *n* is 1 or Ry is a methylene group and *n* is 2 or more, preferably 2.

The N-vinylurethanes suitable for our process may be those compounds having aliphatic or heterocyclic structures. In the instances of the former type reagents, suitable compounds may be structurally represented as follows:

(IV) 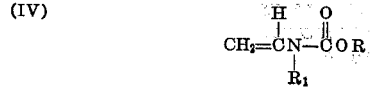

wherein R and $R_1$ are as defined in Formula I, supra. In the instances of those reagents having heterocyclic portions, N-vinyloxazolidene compounds may be structurally represented as follows:

(V)

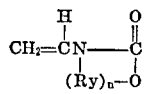

wherein $(Ry)_n$ is as defined in Formula III, supra.

The amount of the N-vinyl compound used to react with the starch base may vary from 0.01 to 100 percent, based on the dry weight of the starch, depending on such factors as the starch base employed, the degree of substitution (D.S.) desired, the particular salt catalyst, and its concentration.

Any type starch, native or converted, having a sufficient number of hydroxyl groups available for reaction with the N-vinyl amido compound or the N-vinyl imido compound, can be used as a base for the preparation of the inhibited or stabilized starch products of this invention. Suitable starches include, for example, corn, potato, amioca, rice, sago, tapioca, waxy maize, sorghum, wheat, and the various derivatives which contain a sufficient number of reactive groups. Hence, among the suitable starches are the various starch derivatives such as ethers, esters, and thin boiling types made by known processes, for example, acid treatments, oxidative, enzymatic, or thermal degradation. Also included are the cold water swelling starches, the starch dextrins, fractions such as amylose or amylopectin, and other depolymerized starch products. Furthermore, it is possible, in this process, to employ a granular starch that has been partially or completely swelled by any known means or homogenized by subjecting it to shear. Gelatinized starches are also useful. Therefore our use of the term "starch" is seen to include any amylaceous materials which possess functional groups capable of reacting with N-vinyl compounds.

The presence of a neutral salt catalyst in the reaction system is not required, but such salts may be utilized to assure a more effective stabilization or inhibition of the starch.

The mechanism by which these salts assist in the reaction is not clearly understood. Nevertheless, it is presumed that they function as catalysts. Among the applicable salts are included: alkali metal halides, alkali metal sulfates, alkali metal nitrates, alkail metal sulfites, alkali metal nitrites, alkali metal thiocyanates, alkaline-earth halides, alkaline-earth nitrates, alkaline-earth, nitrites, and alkali metal salts of organic acids such as sodium tartrate and sodium salicylate. Thus, for the purposes of this invention, the term "neutral salt" is meant to include salts of alkali metal and alkaline-earth metals which give substantially neutral aqueous solutions.

The exact structures of the modified starches are not known with certainty. However, it is reasonable to assume that stabilization is afforded by the presence of the reagent groups bound to the starch by covalent bonds. The characteristic structure of the modified portions of the stabilized starch will depend on the particular reagents chosen. For example, the modified portions of a starch obtained using N-vinylpyrrolidone may be typically represented as follows:

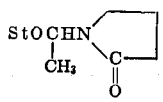

wherein StO is the site on the anhydroglucose unit at which the ethylpyrrolidone group has displaced the hydrogen of a hydroxyl group. The practitioner will recognize that the starch molecule is a polymer of glucose which contains many anhydroglycuose units, each having three free hydroxyl groups which may react with the N-vinyl compound. Therefore, the number of such displacements or the D.S. will vary with the particular starch and reaction conditions.

In the case of the inhibited starches, however, the starch molecules may be crosslinked by acetal groups presumably resulting from the decomposition of the reagent when reacted in the more acidic medium. The inhibited starch products may contain cross-linkages typically represented by the following structure:

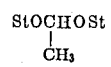

wherein StO is defined as above.

In accordance with this invention, the production of a particular starch is carried out at a controlled pH between 2.0 and 7.0. At a pH between 2.0 and 2.7 a predominantly inhibited product is obtained, while between 2.8 and 7.0 a predominantly stabilized product is obtained.

In general, the novel stabilization and inhibition processes of this invention are carried out by suspending the starch and a salt catalyst in water or a water-miscible organic solvent, adding the reagent, adjusting the pH of the resultant mixture to a level between 2.0 and 7.0, and then agitating the mixture 2 hours or more at temperatures ranging from about 10° C. to about 180° C. under normal or superatmospheric pressure depending on the temperature. The time of the reaction will depend upon reaction conditions such as the temperature, the presence of a salt catalyst and the concentration thereof. The concentrations of the salt, when used, and the reagent may be in excess of 100 percent, by weight, of the starch base. The pH must be maintained within the prescribed range, defined above, at all times in order to produce the desired product. After the reaction, the suspension may be neutralized, if necessary, to a pH between 6.5 and 7.0 by the addition of a suitable base. The starch product may then be recovered by filtering the suspension, washing the starch product essentially free of any residual salt or other contaminants, and finally drying to a moisture constant of about 8–12 percent of the total weight.

In the instance of the inhibition reaction granular starches are more readily adaptable than non-granular starches. Also, since the amount of N-vinyl compound utilized may be as small as 0.01 percent of the weight of the starch, an alternate method for the preparation of the inhibited starch product is afforded. In this procedure an aqueous solution containing from about 10% to 50% of the N-vinyl compound having a pH of about 1.7 is prepared separately and is admixed with an aqueous suspension comprising the starch based material and the neutral salt catalyst in proportional amounts. Thereafter the reaction is achieved by agitating the resultant mixture for a period ranging from 2 up to 17 hours and at pH 2.0–2.7.

In the practice of this invention it is preferred that the reactions be carried out in aqueous media by (1) suspending about 100 parts of a granular starch in about 150 parts of water containing 15–60 parts of sodium sulfate or magnesium sulfate; (2) admixing 3 to 50 parts of the reagent; and (3) agitating the mixture at a pH between 2.8 and 4.5 for stabilization and between 2.0 and 2.7 for inhibition at a temperature ranging from about 25° to 40° C. for at least 2 hours.

The degree of stabilization and inhibition depends on the reaction conditions which determine number of each type of linkage. In all cases, the starch products possess linkages which may be easily destroyed, as a result of their sensitivity to heat and acid. These novel derivatives are characterized by their ability to yield thin, low viscosity dispersions which may be subsequently thickened by the destruction of their linkages thereby leading to swelling and ultimate rupture of their previously intact granules. The characteristics of the starch derivatives may be determined by evaluating the amounts of stabilization or inhibition by the following methods:

The amount of stabilization may be estimated by measuring the difference in nitrogen contents of the particular starch product prior to and subsequent to reaction using the Kjeldahl procedure.

The amount of granular inhibition may be estimated by various known methods, among which are included: Brabender, Brookfield, etc., viscosity measurements, granular swelling power (GSP) measurements, and sediment volume test.

If desired, the modified starch products of this invention may also be prepared by means of a dry process. In carrying out a typical dry procedure the dry starch may first be impregnated with the reagent solution comprising the N-vinyl compound in water at the preferred pH by suspending the starch in the reagent solution or by spraying a fine mist of the reagent solution onto the dry starch as it is agitated. In the former method, the slurry is thoroughly mixed and thereafter dried, using any common means deemed suitable by the practitioner. The dried mixture is then heated to between 105 and 200° C. for 1 to 4 hours, ordinarily. Reaction periods ranging from 3 to 4 hours have been found to be sufficient in most instances and where the higher temperatures of the specified range are used, heating for 15 minutes is sufficient. At the end of the reaction period, the treated starch is allowed to cool. If removal of the salts and organic by-products is desired, the starch is then slurried in water, washed, and dried.

If desired, the products obtained by either of the above-described procedures may subsequently be esterified or etherified using any means suitable for such further conversions well known to those skilled in the art, including controlled degradation by hydrolytic, oxidative, or thermal processes.

It is thus seen that the novel process of this invention enables the practitioner to effectively prepare modified starches having labile groups.

A large number of variations may be made in reacting the starch with the reagent by either the wet or dry procedures described above without materially departing from this invention.

Because of their unique combination of properties, the novel products of this invention can be utilized in many industrial applications such as those employing suspending agents, thickeners, sizings, adhesives, and in various other applications.

The following examples will further illustrate the embodiments of our invention. In these examples, all parts are given by weight, unless specified otherwise.

EXAMPLE I

This example illustrates the reactions of starch with N-vinylpyrrolidone, yielding modified products. This example also demonstrates the lability of the stabilizing groups.

To two reaction vessels provided with stirrers for continuous agitation there were added about 130 parts of water. Under continued agitation the following ingredients (parts by weight) were added in the order indicated to the respective vessels:

(A) Sodium hydroxide 0.8 part, corn starch 100 parts, and N-vinylpyrrolidone 10 parts.

(B) Sodium hydroxide 4.0 parts, sodium sulfate 40 parts, corn starch 100 parts, and N-vinylpyrrolidone 10 parts.

In both cases precautions were taken that all the ingredients preceding the starch were completely dissolved prior to starch addition and the starch was uniformly suspended before adding the reagent. Then the mixtures were agitated at about 25° C. for about 24 hours. At the end of this period the mixtures had the following pH's: 11.9, 12.6. At this point small portions of the above samples were removed, neutralized to pH about 7, filtered, washed essentially salt-free, and dried. Their evaluation by cooks and nitrogen analysis indicated little, if any, reaction. The cooks of the samples resembled cooks of untreated corn starch bases of comparable viscosity.

The remaining portions were adjusted to pH 3.0 with dilute HCl or dilute NaOH and were agitated for an additional period of 15 hours. At the end of this period the reaction mixtures had a pH of about 3.0. They were adjusted to pH about 7.0 and the starch products recovered by filtration, washing essentially salt-free, and drying to about 10–12% moisture.

The resulting products were evaluated using the following cooking procedure and nitrogen analysis and results are listed in Table No. 1.

Cooking procedure

Into separate beakers there were added sufficient amounts of starch and distilled water to obtain a starch suspension of about 8% concentration. After adjusting the mixtures to pH 7.0 and 3.0 respectively, the beakers were placed in a boiling water bath (rolling boil), while agitating continuously until gelatinization took place, but not longer than 5 minutes. The agitation was discontinued and the beakers were covered and left in the boiling water bath for 20 minutes. Then the beakers were removed from the boiling water bath and allowed to stand at room temperature for about 16 hours and the resulting cooks compared to non-treated corn starch bases cooked at the same time.

TABLE NO. 1

| Sample: | Nitrogen (percent dry basis) | D.S. | Description of cold cooks at— pH | pH 3.0 |
| --- | --- | --- | --- | --- |
| A | 0.17 | 0.015 | Moderately heavy salve-like sol, semi-clear | Rigid gel resembling untreated corn starch. |
| B | 0.19 | 0.018 | do | Do. |
| Corn starch | 0.06 | | Firm set mixing to a chunky mass opaque | Moderately firm gel somewhat chunky paste—opaque. |

As may be seen in Table No. 1, the products showed various degrees of substitution (D.S.). Samples cooked at pH 7.0 indicated stabilization in runs A and B.

The cooks at pH 3.0, however, resembled non-treated corn starch of comparable viscosity. The stabilized products, or those exhibiting remarkable non-congealing character of their cooks, as compared to non-treated base, also exhibit an increase of nitrogen content. Presumably, this nitrogen increase results from the introduction of the ethyl pyrrolidone groups.

The results indicated that the substituting groups are labile to cooking a low pH (pH 3.0). The lability of these groups was also confirmed by the experiment described below.

About 50 parts of sample B above were suspended in about 75 ml. water (tap) to which there was added one part of sulfuric acid. The pH of the resulting mixture was about 1.7. The mixtures were agitated at about 25° C. for 16 hours. Then the starch product was recovered by neutralization to pH 7, washing and drying. The product lost all its substituted nitrogen and its cooks resembled non-treated corn starch cooks of comparable viscosity (nitrogen dropped to 0.06% from 0.19%, dry basis). This indicated that all stabilizing and inhibiting groups were removed by this treatment and proved the lability of these groups to acidic treatment.

EXAMPLE II

This example illustrates reactions of N-vinylpyrrolidone with some native starches over prolonged periods of time.

The following materials were added to tap water with agitation in the order and amounts as indicated: (throughout the course of addition and reaction the pH was adjusted to 3.0).

|  | Sample number | | |
|---|---|---|---|
|  | 1 | 2 | 3 |
| Tap water, parts | 750 | 625 | 625 |
| Starch: | | | |
| Type | (1) | (2) | Potato |
| Parts | 500 | 500 | 500 |
| N-vinylpyrrolidone, parts | 100 | 50 | 50 |

1 High amylose corn.
2 Waxy maize.

The resulting mixtures were agitated at pH 3.0 and at 25° C. and portions were withdrawn after 4, 6 and 22 hours, adjusted to pH 4.5 and recovered by washing and drying as in Example I. The products were designated a, b, c. As may be seen in Table No. 2 the D.S. increased with increasing reaction time. The colloidal properties of cooks varied depending on the base.

TABLE NO. 2

| Sample | Reaction time (hrs.) | Nitrogen (percent dry basis) | D.S. | Description of cold cook, pH 7.0 |
|---|---|---|---|---|
| 1a | 4 | 0.16 | 0.019 | Thin, opaque fluid. Incomplete dispersions. |
| 1b | 6 | 0.18 | 0.021 | |
| 1c | 22 | 0.35 | 0.042 | |
| 2a | 4 | 0.06 | 0.007 | Moderately heavy, cohesive, clear fluids. |
| 2b | 6 | 0.08 | 0.009 | |
| 2c | 22 | 0.18 | 0.021 | |
| 3a | 4 | 0.05 | 0.006 | Do. |
| 3b | 6 | 0.07 | 0.008 | |
| 3c | 22 | 0.19 | 0.023 | |

EXAMPLE III

This example illustrates reactions of N-vinylpyrrolidone with waxy maize by contacting the starch with the reagent in aqueous medium and also in the course of drying.

Three aqueous suspensions of 200 parts waxy maize in 250 parts water each were prepared and mixed with the following amounts of N-vinylpyrrolidone and at pH's as indicated:

| Sample | Parts of N-vinyl pyrrolidone | pH of the mixture |
|---|---|---|
| a | 6 | 3.0 |
| b | 8 | 3.5 |
| c | 10 | 4.0 |

The resulting mixtures were agitated at about 40° C. for five hours. At the end of this period the pH's of mixtures read 2.8, 3.3 and 3.8 respectively. At this point the products were filtered and air dried without washing. For analysis, small samples were taken and each was adjusted to pH 7.0. Then these samples were thoroughly washed by resuspension and analyzed for nitrogen content. As may be seen in Table No. 3, the reaction efficiency is greatly improved by this procedure and was best at pH 3.

TABLE NO. 3

| Sample | Nitrogen (percent dry basis) | D.S. |
|---|---|---|
| a | 0.19 | 0.023 |
| b | 0.14 | 0.017 |
| c | 0.09 | 0.011 |

EXAMPLE IV

This example illustrates the use of diethylaminoethylated high amylose corn starch (70% amylose) as base in the reaction with N-vinylpyrrolidone.

Using the method taught by the assignee's U.S. Pat. No. 2,813,093 a high amylose corn starch (70% amylose) was diethylaminoethylated by reaction with beta-diethylaminoethylchloride hydrochloride. This product had a nitrogen content of 0.40 percent, by weight, on a dry basis. One hundred parts of the said product was suspended in about 150 parts water and acidified to a pH of 3.0 with dilute hydrochloric acid. About 15 parts of sodium chloride and 10 parts of N-vinylpyrrolidone were added to this slurry and the resulting mixture was agitated at 40° C. for 4 hours. After the reaction the pH of the mixture was 3.0 and was adjusted to 4.5 with dilute sodium hydroxide solution and the product recovered by washing and drying as described in Example II.

Analysis indicated that the nitrogen content of the product had been increased to 0.45% dry basis.

EXAMPLES V–IX

These examples illustrate reactions of N-vinylpyrrolidone with various starch bases at elevated temperature.

Corn starch converted by acid treatment to a WF of 65, high amylose corn containing about 70% amylose, and waxy maize containing less than 2% amylose were reacted as described below:

The reaction formulations are given in Table No. 4.

TABLE NO. 4

|  | Examples | | | | |
|---|---|---|---|---|---|
|  | V | VI | VII | VIII | IX |
| Thin boiling (acid fluidity) corn starch (WF 65) | 100 | 100 | | | |
| High amylose corn | | | 50 | 50 | |
| Waxy maize | | | | | 200 |
| Water | 125 | 125 | 75 | 75 | 250 |
| Sodium sulfate | 60 | 60 | 40 | 40 | |
| N-vinylpyrrolidone | 20 | 20 | 25 | 25 | 20 |
| pH adjusted to | 4.0 | 5.5 | 4.5 | 6.0 | 2.8 |

In Examples V through VIII the reactions were carried out by suspending the starch in the indicated amount of sodium sulfate and adjusting the slurry to the indicated pH, while ading the reagent. The resulting mixtures were placed in constant temperature baths and agitated as follows: In Examples V and VI the reactions were carried out at 52° C. over a period of 16 hours and those of Examples VII and VIII to 100° C. over a period of 2 hours. Then each mixture was adjusted to a pH of 5.0 by adding dilute acid or sodium hydroxide solution, as required. The modified starches were then recovered by washing the reaction products essentially free of any salts and drying to a moisture content of about 12 percent.

In Example IX the reaction was carried out by suspending the starch in water, adding the reagent and adjusting the pH to 2.8 with dilute HCl. After about 10 minutes the starch was recovered by filtration, dried to about 3% moisture, and heated at 200° C. for 5 hours. A brown dextrinlike product resulted.

The products were analyzed for nitrogen content and evaluated by cooking as in Example I. The results of the evaluation are described below.

*Example V*: (0.44% N, D.S. 0.053) the cold cook at 15% starch solids was a thin, cohesive, semi-clear fluid.

*Example VI*: (0.062% N, D.S. 0.008) The cold cook at 15% starch solids was a heavy chunky mass resembling the untreated starch base.

*Example VII*: (0.059% N, D.S. 0.073) the cold cook at 10% starch solids was thinner and more dispersed than the starch base, but still opaque and syneretic.

*Example VIII*: (0.59% N, D.S. 0.073) The cold cook at 10% solids had the same properties as that of Example VII.

*Example IX*: The product was completely soluble in cold water at 50% solids, giving a thin, dark dispersion.

EXAMPLES X–XV

These examples illustrate the preparation of additional starch products of this invention by means of an aqueous system.

The procedures employed in preparing these starch products were essentially the same as described in Example I, except the corn starch was replaced by a particularly treated starch in each instance. Also various salts were substituted for the sodium sulfate wherever a salt catalyst was employed. The said particularly treated starches are described as folows:

(a) A thin boiling, corn starch having a water fluidity (WF) of about 75, obtained by oxidizing the starch with sodium hypochlorite.

(b) Corn starch dextrin (white) prepared by heat conversion.

(c) Acetylated native corn starch.

(d) Corn starch having sulfonato-succinate groups prepared according to the method set forth in Example I of assignee's U.S. Pat. No. 2,285,727.

(e) A thin boiling waxy maize (WF of about 85) having octenyl succinate half ester groups.

(f) Corn starch having sodium phthalate half-ester groups. Compositions of the reaction mixtures employing the above described treated starches are set forth in Table 5 below. All concentrations are in parts, by weight, unless specified otherwise.

TABLE NO. 5

| Ingredient | Example No. | | | | | |
|---|---|---|---|---|---|---|
| | X | XI | XII | XIII | XIV | XV |
| Starch base (100 parts) | a | b | c | d | e | f |
| Water | 130 | 60 | 130 | 130 | 60 | 130 |
| Ethanol | | 80 | | | 80 | |
| Potassium sulfate | 30 | | | | | |
| Cyanoguanidine | | 30 | | | | |
| Magnesium sulfate | | | 30 | | | |
| Ammonium thiocyanate | | | | 30 | | |
| EDTA* | | | | | | 10 |
| Vinylpyrrolidone | 10 | 10 | 10 | 10 | 10 | 10 |
| pH | 3.0 | 3.0 | 3.5 | 4.0 | 4.5 | 3.5 |

*Disodium salt ethylenediamine tetraacetic acid.

The prepared compositions were first agitated for 17 hours at 40° C., neutralized to pH 5, filtered, washed and dried. The resultant modified starches obtained as the dried reaction products each had a moisture content of about 8 percent of the total weight. Evaluation procedures were similar to those of Example I, except for Examples XI and XIV. These products, due to the tendencies of the starch base to swell in cold water, were washed and filtered in aqueous-alcohol solution. Thereafter, using the Kjeldahl method, the extents of the reactions were determined. The respective nitrogen content analyses were as follows: (X) 0.20, (XI) 0.11, (XII) 0.22, (XIII) 0.19, (XIV) 0.10, and (XV) 0.20.

Thus, it may be seen that various types of modified starches may be used in this invention. Although different starch bases reacted to different extents, a reaction occurred in every instance.

EXAMPLE XVI

This example illustrates the preparation of a stabilized starch product of this invention by means of a dry process.

Approximately 100 grams of corn starch were suspended in 125 ml. of water, and the slurry was acidified to a pH of 3.0, filtered and dried to a moisture content of 8%. A reagent solution comprising about 10 parts of vinylpyrrolidone dissolved in 22 parts of water and having a pH adjusted to 3.0 by the addition of 7.2 parts of phosphoric acid was then sprayed onto the dried starch as it was being agitated. Agitation was continued for 2 hours, whereupon the resulting mixture was dried and heat reacted in a forced air oven set at 130° C. over a period of 3 hours. Thereafter the starch product was cooled, washed and recovered in the manner described in Example I. The dried yellow powder thus obtained had a D.S. of 0.046 as indicated by a nitrogen content of 0.58 percent.

A cooked dispersion of this stabilized starch, unlike that of a control dispersion which had been prepared using an untreated, identical starch base, exhibited stabilization which could be removed by heating in acid.

EXAMPLE XVII

This example illustrates the effect of varying certain reaction conditions or the concentration of the particular catalyst used in the preparation of these modified starch products.

(A) Variation in Reaction Time—Using a method similar to that of Example I, an additional quantity of N-vinylpyrrolidone reacted corn starch was prepared as follows:

One hundred parts of corn starch were suspended in 125 parts of water containing 40 parts of sodium sulfate, and the mixture was stirred. Then the pH of the mixture was adjusted to 3.0 by the addition of dilute HCl. Thereafter 10 parts of N-vinylpyrrolidone were stirred into the mixture slowly, and the reaction was continued for several days. Homogeneous samples were withdrawn at intervals of (a) 16, (b) 24, and (c) 116 hours. Starch products of each sample were then recovered in the manner set forth in Example I. Also an additional sample was prepared by resuspending 1 part of (a) in 2 parts of water and stirring the suspension at pH 11.5 for 16 hours, whereupon the product, (d) was recovered in the aforesaid manner.

Cooks were prepared from the air dried products of each of the above described samples. Then, repeating the evaluation procedures employed in Example I, the degree of substitution and stability of these products were evaluated. Results are presented below in Table No. VI.

TABLE NO. 6

| Sample | Percent nitrogen content | D.S. | Cook stability |
|---|---|---|---|
| a | 0.54 | 0.07 | Good. |
| b | 0.46 | 0.06 | Do. |
| c | 0.41 | 0.05 | Do. |
| d | 0.38 | 0.046 | Do. |

(B) Variation in the amount of salt catalyst. — The method employed in Example I was repeated in the preparation of a series of the typically modified starches of this invention, except the amounts of the neutral salt were varied. In each of the initial samples there was contained, in addition to the corn starch and 10 percent of the N-vinylpyrrolidone based on the amount of the said starch, a varied quantity of sodium sulfate. After the addition of all the ingredients, the mixtures having pH levels adjusted to 3.0 were agitated at 25° C. for about 17 hours. Then the resulting suspensions were neutralized to a pH of 7.0 with a 3 percent sodium hydroxide solution. The strach products were then recovered by filtering, washing, and drying. The dried starch products having a moisture content between 10 and 12 percent of their total weight, were then tested by cooking according to the procedure of Example I. The colloidal properties of the resulting cooks were then compared. Results are set forth in Table VII below.

TABLE NO. 7

| Sample No. | Sodium sulfate (percent based on total starch) | Nitrogen content (percent on dry basis) | Cook evaluation (cold stability) |
|---|---|---|---|
| 1 | 5 | 0.27 | Slightly rubbery, salve-like. |
| 2 | 10 | 0.31 | Very slightly rubbery, salve-like. |
| 3 | 20 | 0.42 | Smooth, salve-like. |
| 4 | 30 | 0.48 | Do. |
| 5 | 40 | 0.44 | Smooth, very thin inhibited. |
| Control[1] | | 0.18 | |

[1] Similar to Example I, except sodium sulfate was not used.

As indicated in the table, samples made using greater amounts of the salt catalyst exhibited higher substitution.

EXAMPLE XVIII

This example illustrates the usefulness of a cyclic N-vinyl imide in the preparation of a modified starch typical of this invention.

In this case, the particular starch was modified with N-vinylsuccinimide as follows:

50 parts of corn starch were suspended in an aqueous-salt solution comprising 62 parts of tap water and 20 parts of sodium sulfate. This slurry was thoroughly agitated, and the pH was adjusted to 6.2. Then the reagent was added, and the mixture was agitated at 40° C. for about 16 hours. The pH of this mixture was then adjusted to 7.0, and the resultant starch product was recovered and evaluated in the manner set forth in Example I. The dried product had a nitrogen content of 0.13 percent, by weight, which corresponded to a D.S. of 0.01.

EXAMPLE XIX

This example illustrates the usefulness of a cyclic N-vinyl imide in the preparation of a modified starch typical of this invention by a reaction in aqueous acetone.

In this case, the starch was modified with N-vinylphthalimide using the method described in Example XVIII, except a 1:1 aqueous-acetone medium was employed and the amounts of the ingredients were as follows:

|  | Parts |
|---|---|
| Corn starch | 100 |
| Water | 125 |
| Acetone | 125 |
| $NA_2SO_4$ | 30 |
| N-vinyl phtahlimide | 20 |
| pH | 3.0 |

Upon adjusting the pH of the agitated mixture to 7.0, the modified starch was recovered and evaluated in the manner set forth in Example I. The dried product had a nitrogen content of 0.46 percent, by weight, thus indicating a D.S. of 0.064.

EXAMPLE XX

This example illustrates the usefulness of an N-vinyl cyclic urethane in the preparation of a modified starch typical of this invention.

The procedural steps of Example XVIII were repeated, except 20 parts of N-vinyloxazolidone was used in lieu of the N-vinyl succinimide, and the reaction was carried out at pH 3.0 instead of 6.2. The N-vinyl oxazolidone employed herein was prepared according to the method described by E. K. Drechel, J. Org. Chem., 22, 819.

The present modified starch had a nitrogen content of 0.17 percent, based on the total weight, which corresponded to a D.S. of 0.02.

Summarizing, it is thus seen that this invention provides novel, modified starch products, as well as processes for their preparation. Variations may be made in proportions, procedures and materials without departing from the scope of this invention defined in the following claims.

We claim:

1. A process for preparing a modified starch comprising reacting starch in an aqueous or aqueous-based medium at a pH between 2.0 and 7.0 with a N-vinyl compound selected from the group consisting of N-vinylamides, N-vinyllactams, N-vinylimides, N-vinylurethanes and N-vinyloxazolidones, wherein the nitrogen to which the vinyl group is attached is adjacent to at least one carbonyl group, for a period of from 2 to 17 hours at a temperature from 10 to 180° C., said N-vinyl compound being present in an amount from about 0.01 to 100 percent, by weight, or starch.

2. A process according to claim 1 wherein said N-vinyl compound is N-vinylpyrrolidone.

3. A process according to claim 1 in which the reaction medium is a mixture of water and a water miscible organic solvent.

4. A process according to claim 1 wherein said N-vinyl compound is present in an amount from about 3.0 to about 50 percent, by weight, of the starch.

5. A process according to claim 4 wherein there is also present up to about 80%, by weight, of the dry starch of a water soluble neutral salt selected from the group consisting af neutral alkaline and alkaline earth salts.

6. A process according to claim 5 wherein said salt is selected from the group consisting of sodium sulfate, magnesium sulfate, and mixtures thereof.

7. A modified starch produced by reacting starch in an aqueous or aqueous-based medium at a pH between 2.0 and 7.0 with a N-vinyl compound selected from the group consisting of N-vinylamides, N-vinyllactams, N-vinylimides, N-vinylurethanes and N-vinyloxazolidones, wherein the nitrogen to which the vinyl group is attached is adjacent to at least one carbonyl group, for a period of from 2 to 17 hours at a temperature from 10 to 180° C., said N-vinyl compound being present in an amount from about 0.01 to 100 percent, by weight, of starch.

8. The modified starch of claim 7 wherein the N-vinyl compound is present in an amount from about 3.0 to about 50 percent, by weight, of the starch.

9. The modified starch of claim 8 wherein the N-vinyl compound is N-vinylpyrrolidone.

10. A process for preparing a modified starch comprising:
(a) mixing a starch with an aqueous or aqueous-based N-vinyl compound solution having a pH between 2.0 and 7.0, said N-vinyl compound selected from the group consisting of N-vinylamides, N-vinyllactams, N-vinylimides, N-vinylurethanes and N-vinyloxazolidones wherein the nitrogen to which the vinyl group is attached is adjacent to at least one carbonyl group,
(b) drying the impregnated starch, and
(c) heating the dried starch at a temperature between about 105–200° C. for a period ranging from ¼ to 4 hours.

11. The modified starch prepared by the process of claim 10.

References Cited

UNITED STATES PATENTS 3,095,391    6/1963    Brockway et al. _____ 260—17.4

DONALD E. CZAJA, Primary Examiner

M. I. MARQUIS, Assistant Examiner

U.S. Cl. X.R.

260—17.4, 77.5 B, 77.5 BB, 233.3 A, 233.5